United States Patent [19]

Leroux et al.

[11] Patent Number: 5,262,454
[45] Date of Patent: Nov. 16, 1993

[54] FLAME-RESISTANT POLYORGANOSILOXANE COMPOUND CONTAINING HOLLOW GLASS BALLS AND INTUMESCENT COMPOUND

[75] Inventors: Roland Leroux, Stadecken-Elsheim; Jurgen Thurk, Schornsheim; Reinhard Jonas, Idstein, all of Fed. Rep. of Germany

[73] Assignees: Down Corning GmbH, Rheingaustrasse; Schott Glaswerke, Hattenbergstrasse, both of Fed. Rep. of Germany

[21] Appl. No.: 826,297

[22] Filed: Jan. 24, 1992

Related U.S. Application Data

[63] Continuation of Ser. No. 690,017, Apr. 23, 1991, abandoned.

[30] Foreign Application Priority Data

Apr. 25, 1990 [DE] Fed. Rep. of Germany ....... 4013161

[51] Int. Cl.⁵ .................................................. C08J 9/32
[52] U.S. Cl. ...................................... 523/219; 523/218
[58] Field of Search ................................. 523/218, 219

[56] References Cited

U.S. PATENT DOCUMENTS

| | | | |
|---|---|---|---|
| 3,957,717 | 5/1976 | Harada et al. | 260/375 B |
| 4,266,039 | 5/1981 | Hons-Olivier et al. | 521/85 |
| 4,433,069 | 2/1984 | Harper | 521/99 |

FOREIGN PATENT DOCUMENTS

2909462  5/1989  Fed. Rep. of Germany .

*Primary Examiner*—Paul R. Michl
*Assistant Examiner*—U. K. Rajguru
*Attorney, Agent, or Firm*—Roger H. Borrousch

[57] ABSTRACT

A flame-resistant, hardenable polyorganosiloxane compound is described with a content of 2 to 40 weight % hollow glass balls with an outside diameter of up to 200 $\mu$m and 3 to 50 weight % of an inorganic intumescent compound which expands at a temperature from 80° to 250° C. The preferred intumescent compound is expandable graphite. The compound can replace the previous compounds provided with polyhalogenated diphenyl compounds in fireproof windows.

12 Claims, No Drawings

FLAME-RESISTANT POLYORGANOSILOXANE COMPOUND CONTAINING HOLLOW GLASS BALLS AND INTUMESCENT COMPOUND

This is a continuation of copending application Ser. No. 07/690,017 filed on Apr. 23, 1990, now abandoned.

Hardenable polyorganosiloxane compounds are most used as high-quality sealing and adhesive materials which can be subjected to high stress. They harden permanently elastically and are used for sealing gaps, e.g. in the field of plumbing and in building, as well as in the manufacture of windows, e.g. as a rebate seal when bedding window panes in frames with putty or for joining glass panes together.

It is often necessary to make these compounds flame-resistant which up to now was achieved most effectively by adding halogenated diphenyl compound, e.g. octabromodiphenyl ether or nonabromodiphenyl (e.g. German patent 29 09 462 or German patent application 30 41 031). These halogenated diphenyl compounds in case of fire may form the polyhalogenated dibenzofurans or dibenzodioxins known to be toxic. Although the flame-resistant polyorganosiloxane compounds prepared in this way generally have adequate flameproofing properties their use should be restricted for the reasons stated above.

It is the object of the invention to find a flame-resistant, hardenable polyorganosiloxane compound of comparable effect which is free from halogenated diphenyl compounds.

Surprisingly, we have found that a well-balanced combination of hollow glass balls and intumescent compound has a flameproofing effect similar to the halogenated diphenyl compounds previously used for this purpose.

The invention provides in one of its aspects a flame-resistant, hardenable polyorganosiloxane compound characterised by a content of 2 to 40 weight % hollow glass balls with an outside diameter of up to 200 μm and 3 to 50 weight % of an inorganic intumescent compound which expands at a temperature from 80° to 240° C.

The hollow glass balls should have an outside diameter of up to about 200 μm and be present in a quantity from 2 to 40 weight % in the polyorganosiloxane compound. Hollow glass balls with an outside diameter of less than 5 μm can be manufactured only with great difficulty, and therefore expensively, so that for practical reasons smaller balls should no longer be used. If the diameter of 200 μm is exceeded an ever increasing proportion of the balls are destroyed by breaking when mixed into the poly-organosiloxane compound. Balls with a diameter of over 60 μm cause increasing roughness of the surface of the finished compound. As this is generally undesirable balls with a diameter of less than 60 μm, particularly less than 50 μm, are preferred. The quantity of hollow glass balls should not exceed 40 weight % in the compound as the compound then becomes so stiff that it can only be handled with difficulty. In case of a proportion below 2 weight % the effect becomes too small. Particularly preferred is a content from about 6 to 25, in particular 10 to 20 weight %. Apart from the flameproofing effect, addition of the hollow glass balls also causes an often desirable reduction in the density and thermal conductivity of the compound.

In order to keep the flameproofing effect as great as possible it is further advantageous if the balls are filled with a gas which does not in any way contribute to any possible burning, i.e. a non-combustible gas, wherein by combustible gas is also meant oxygen or air. In particular nitrogen and carbon dioxide are available as a charge for the balls but other gases, such as in particular sulphur hexafluoride, are conceivable too wherein balls with the latter gas charge are not commercially available at present. The use of a particular type of glass for the balls is not critical. Both borosilicate glass and ordinary soda-lime glass can be used. The balls which are usually available commercially are made of soda-lime glass.

The second essential for flameproofing properties is the intumescent compound. The intumescent compound should be of the inorganic kind in order to avoid the formation of readily inflammable cleavage products. It is also important that foaming of the intumescent compound begins before the spontaneous combustion temperature of polyorganosiloxanes or of the softeners etc. optionally contained in the polyorganosiloxane compound or of the pyrolysis products formed from them is reached. On the other hand, the intumescent compound should of course still be stable at the highest temperatures of use and working that occur. It has therefore proved to be very generally advantageous if the intumescent compounds begin to foam at temperatures between about 80° to 250° C. It is easy here for anyone skilled in the art to select within this temperature range the intumescent compound or a mixture of different intumescent materials which have the most favourable reaction temperature or the most favourable reaction temperature range for the intended purpose. Of course, other intumescent materials with a higher initiating temperature may be added as well, which then cause additional intumescence at a later point in time, or those which release non-combustible or flame-retardant gases under temperature stress.

The intumescent compound should be used in a quantity from 3 to 50 weight %. Below 3 weight % an adequate effect is no longer obtainable and above 50 weight % the polysiloxane compound in case of fire is expanded so much that the resulting compound no longer has sufficient cohesion. Good results are obtained with a content from 5 to 26 weight % of intumescent compound. The optimum content can easily be ascertained by preliminary tests, wherein it is to be taken into account that the use of intumescent compounds with high intumescence allows a lower percentage content, and that intumescent compounds with lower intumescence must be added in a larger quantity.

Intumescent compounds are abundantly available commercially and well known to anyone skilled in the art. As intumescent compounds there are used compounds which in case of fire either expand greatly themselves or which split off e.g. water of crystallisation or binding in vapour form or carbon dioxide and hence cause a very great increase in volume of the whole polyorganosiloxane compound. Suitable for use within the above temperature range are e.g. vermiculites, perlites, mica, expandable graphite, wermlandite, thanmasite, hydrotalcite etc. Most particularly good results are obtained with expandable graphite, preferably in quantities from 5 to 25 weight %, in particular from 7 to 15 weight %.

The formulations of polyorganosiloxane matrices which can be made flame-resistant by the content of hollow glass balls and inorganic intumescent compound according to the invention, are well known to anyone skilled in the art and are described in countless publications. The matrices consist of a base polymer, optionally a softener, fillers and reinforcing materials as well as a crosslinking agent or crosslinking catalyst. As base polymers there are used mainly polydimethyl and polydimethylphenyl siloxanes which contain crosslinking groups containing hydroxyl or vinyl or hexenyl, preferably those which are terminally blocked with these groups. Silicone oils, i.e. generally dimethyl polysiloxanes or dimethylphenyl siloxanes terminally blocked with methyl, are used as softeners, the content of which is preferably kept as low as possible due to their higher inflammability. To improve the mechanical properties of the end product soot or silicic acid, particularly pyrogenic silicic acid, is added to the compound. Inert fillers are e.g. diatomaceous earth. Crosslinking catalysts are e.g. peroxides for compounds which should be hardenable only at an elevated temperature. For cold-setting two-component compounds the matrix is crosslinked with e.g. tetraethyl silicate as the crosslinking agent and e.g. dibutyltin dilaurate as the catalyst. In case of cold-setting single-component compounds, e.g. the so-called acetoxy system, crosslinking takes place by means of a crosslinking agent which can be activated by atmospheric moisture. With these compounds care must be taken that the intumescent compound does not accidentally initiate hardening. Details of matrices and catalyst systems can be found in the current handbooks, e.g. Noll, "Chemistry and Technology of Silicones", Verlag Chemie, Weinheim/Bergstr. 1960 or "Silicones, Chemistry and Technology", Vulkan Verlag, Essen 1989. Independently of the selected cross-linking system the properties of hardened, crosslinked silicone rubbers are similar to each other so that the addition of hollow glass balls and intumescent compounds according to the invention works in all cases. The polymer matrices as well as crosslinking agents, catalysts etc. are available both separately and in largely pre-prepared mixtures from numerous well-known chemical companies.

In any case the basic structure of the flame-resistant, hardenable polyorganosiloxane compound according to the invention or the compound to be worked into suitable silicone rubber products may be as follows:
- a) 10 to 85 weight % uncatalysed ordinary commercial siloxane (base polymer);
- b) 0 to 30 weight % polyorganosiloxane as softener (silicone oil, e.g. polydimethyl siloxane terminally blocked with methyl);
- c) 0 to 50 weight % higher disperse, active filler as reinforcing component (pyrogenic silicic acid);
- d) 0 to 10 weight % pigments, pure or in paste form;
- e) 0.5 to 15 weight % crosslinking agent/catalyst, matched to the respective crosslinking system;
- f) 0 to 50 weight % inactive filler;
- g) 2 to 40 weight % hollow glass balls, and
- h) 3 to 50 weight % intumescent compound.

The polyorganosiloxane compounds according to the invention have excellent flameproofing properties without need to fear the formation of toxic pyrolysis products in case of fire.

EXAMPLE

A flame-resistant, hardenable polyorganosiloxane compound of the following composition was prepared:
  66 weight % polydimethylphenyl siloxane terminally blocked with OH;
  4.5 weight % atmospheric moisture-reacting crosslinking agent of the acetate type (including 0.02 weight % Sn catalyst);
  4.5 weight % pyrogenic silicic acid as reinforcing agent;
  15 weight % air-filled hollow glass balls of diameter about 40 μm, and
  10 weight % expandable graphite (manufacturer: SIGRI, type FR 90-60/80).

A fireproof double glazing unit consisting of a prestressed borosilicate glass pane with a thickness of 6 mm and a float glass pane with a thickness of 4 mm, was produced by holding the panes at a distance of 12 mm from each other by means of a steel spacer and cementing them in the edge gap with the above-mentioned compound. After hardening of the compound the unit was installed in a steel frame and the rebates above the sealing strips sealed, also with the compound described above. After hardening of the compound, the window was subjected to a fire test in accordance with DIN 4102, part 13, the borosilicate glass pane being located on the flame side. It turned out that the compound maintained its sealing function up to the end of the test after 60 minutes and that above all on the side remote from the fire no flames arose from the seal or pyrolysis products thereof. Such a good fireproofing effect could previously be obtained only with the flameproofing combination of chalk and a highly brominated diphenyl compound described in German patent 29 09 462.

That which is claimed is:

1. Flame-resistant, hardenable polyorganosiloxane compound characterised by a content of 2 to 40 weight % hollow glass balls with an outside diameter of up to 200 μm and 3 to 50 weight % of an inorganic intumescent compound which expands at a temperature from 80° to 240° C.

2. Compound according to claim 1 characterised by a content of 10 to 20 weight % hollow glass balls.

3. Compound according to claim 1 characterised in that the hollow glass balls are filled with a non-combustible gas.

4. Compound according to clam 1 characterised by a content of 5 to 25 weight % intumescent compound.

5. Compound according to claim 1 characterised in that the intumescent compound is selected from the group consisting of vermiculite, perlite, mica, expandable graphite, wermlandite, thanmasite and hydrocalcite.

6. Compound according to claim 5 characterised by the use of expandable graphite as the intumescent compound.

7. Compound according to claim 6 characterised by a content of 8 to 15 weight % expandable graphite.

8. A method for improving the fire resistance of a polyorganosiloxane composition which comprises providing in a hardenable polyorganosiloxane composition from 2 to 40 weight % of hollow glass balls with an outside diameter of up to 200 μm and 3 to 50 weight % of an organic intumescent compound which expands at a temperature from 80° C. to 240° C.

9. A flame-resistant, hardenable polyorganosiloxane compound comprising 2 to 40 weight % hollow glass balls with an outside diameter of up to 200 micrometers and 3 to 50 weight % of expandable graphite.

10. The compound according to claim 9 in which the expandable graphite is present in an amount of 8 to 15 weight %.

11. In a method of sealing, the improvement consisting of forming a seal with the compound of claim 9.

12. In a method of sealing a window to make them fire-retardant, the improvement consisting of adhering and sealing the window with the compound of claim 9.

* * * * *

UNITED STATES PATENT AND TRADEMARK OFFICE
CERTIFICATE OF CORRECTION

PATENT NO.  : 5,262,454
DATED       : November 16, 1993
INVENTOR(S) : Roland Leroux, Jurgen Thurk, and Reinhard Jonas It is certified that error appears in the above-identified patent and that said Letters Patent is hereby corrected as shown below:

>  On the title page, the assignee should read as follows:
>
> DOW CORNING GmbH, Rheingaustrasse; SCHOTT GLASWERKE, Hattenbergstrasse, Both of Fed. Rep. of Germany

Signed and Sealed this

Nineteenth Day of April, 1994

Attest:

BRUCE LEHMAN

*Attesting Officer*    *Commissioner of Patents and Trademarks*